United States Patent
Raghavan et al.

(10) Patent No.: US 10,742,295 B2
(45) Date of Patent: Aug. 11, 2020

(54) METHODS FOR EARLY STOPPAGE OF BEAM REFINEMENT IN MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/257,984

(22) Filed: Jan. 25, 2019

(65) Prior Publication Data

US 2019/0341989 A1    Nov. 7, 2019

Related U.S. Application Data

(60) Provisional application No. 62/667,372, filed on May 4, 2018.

(51) Int. Cl.
| | | |
|---|---|---|
| *H04B 7/06* | (2006.01) | |
| *H04B 7/155* | (2006.01) | |
| *H04B 17/391* | (2015.01) | |
| *H04B 17/327* | (2015.01) | |
| *G01S 11/10* | (2006.01) | |

(52) U.S. Cl.
CPC ............ *H04B 7/0628* (2013.01); *G01S 11/10* (2013.01); *H04B 7/0639* (2013.01); *H04B 7/0695* (2013.01); *H04B 7/1555* (2013.01); *H04B 17/327* (2015.01); *H04B 17/391* (2015.01)

(58) Field of Classification Search
CPC .. H04B 7/0628; H04B 17/327; H04B 17/391; H04B 7/0639; H04B 7/0695; H04B 7/1555; G07S 11/10
See application file for complete search history.

(56) References Cited

U.S. PATENT DOCUMENTS

| | | | |
|---|---|---|---|
| 2015/0049824 A1 | 2/2015 | Kim et al. | |
| 2017/0134079 A1* | 5/2017 | Kim | .................... H04B 7/0421 |
| 2017/0374586 A1* | 12/2017 | Condeixa | .......... H04W 36/0055 |
| 2018/0048442 A1 | 2/2018 | Sang et al. | |

(Continued)

FOREIGN PATENT DOCUMENTS

| | | |
|---|---|---|
| EP | 3413607 A1 | 12/2018 |
| WO | 2017135455 A1 | 8/2017 |
| WO | 2018063190 A1 | 4/2018 |

OTHER PUBLICATIONS

International Search Report and Written Opinion—PCT/US2019/019599—ISA/EPO—dated Apr. 30, 2019.

*Primary Examiner* — Jaison Joseph
(74) *Attorney, Agent, or Firm* — Changwoo Yang

(57) ABSTRACT

A method, apparatus, and computer-readable medium are provided that enable a base station to stop a beam refinement procedure prior to a completion of the beam refinement procedure. A UE receives a signal over a plurality of beams from a base station and transmits an indication to the base station in a beam refinement procedure during a hierarchical beamforming process. The indication may comprise at least one of a beam switching capability of the UE, mobility information for the UE, Doppler estimate information for the UE, or a plurality of training signals on a selected beam.

30 Claims, 16 Drawing Sheets

(56) References Cited

U.S. PATENT DOCUMENTS

| | | | |
|---|---|---|---|
| 2018/0049042 A1* | 2/2018 | Yu | H04B 7/0695 |
| 2018/0279143 A1* | 9/2018 | Bhattad | H04B 17/309 |
| 2019/0140713 A1* | 5/2019 | Cheng | H04B 7/0473 |
| 2019/0229776 A1* | 7/2019 | Cao | H04B 7/0408 |
| 2019/0280753 A1* | 9/2019 | Maamari | H04B 7/0626 |

* cited by examiner

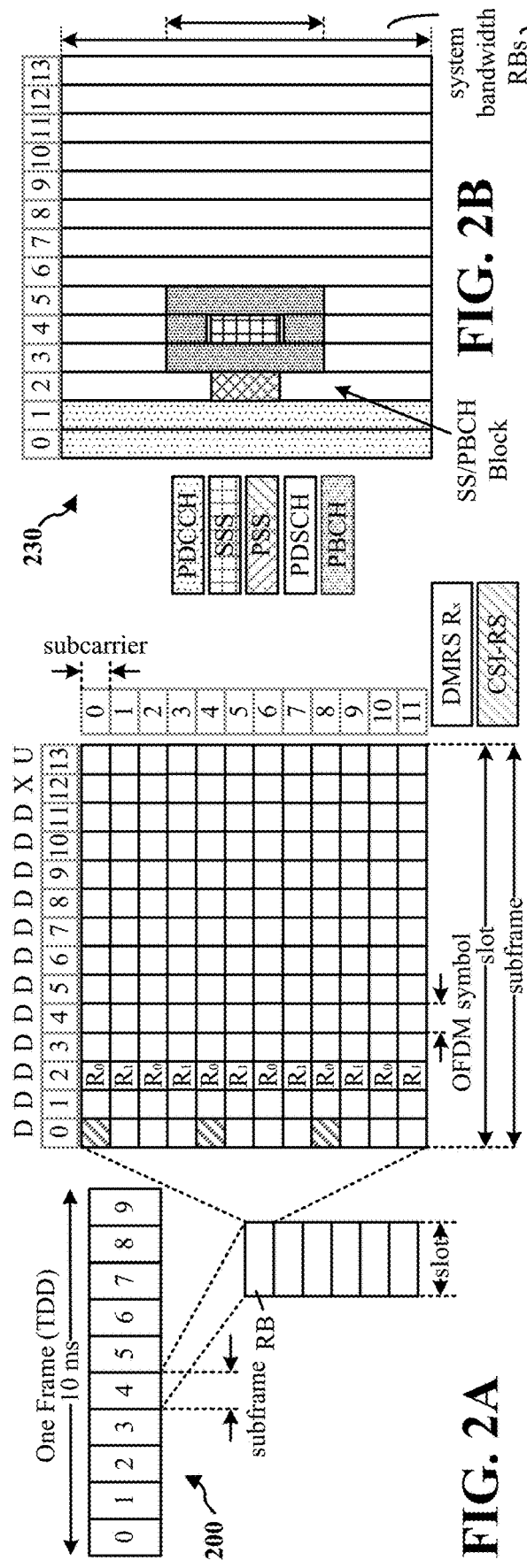
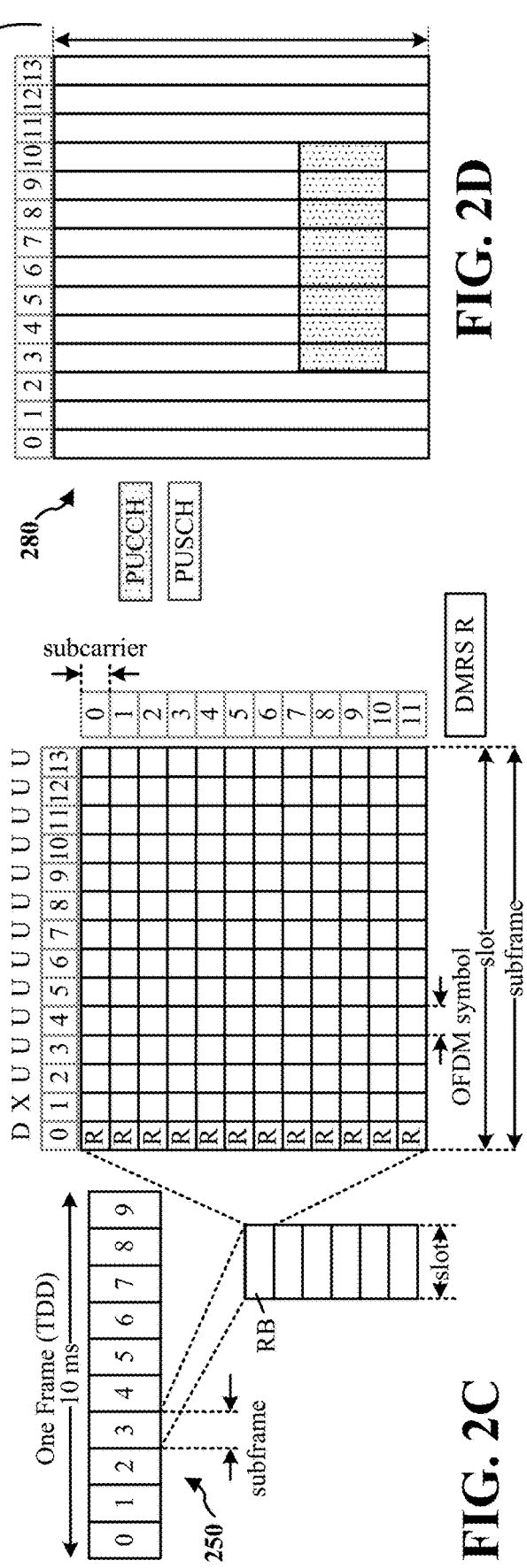
FIG. 2A
FIG. 2B
FIG. 2C
FIG. 2D

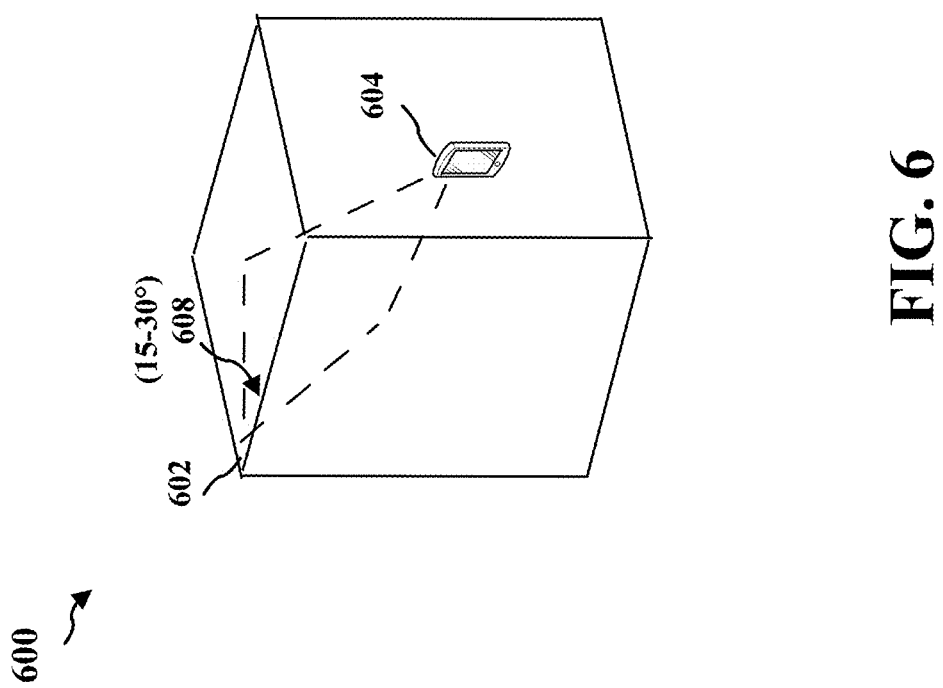

METHODS FOR EARLY STOPPAGE OF BEAM REFINEMENT IN MILLIMETER WAVE SYSTEMS

CROSS-REFERENCE TO RELATED APPLICATION(S)

This application claims the benefit of U.S. Provisional Application Ser. No. 62/667,372, entitled "METHODS FOR EARLY STOPPAGE OF BEAM REFINEMENT IN MILLIMETER WAVE SYSTEMS" and filed on May 4, 2018, the disclosure of which is expressly incorporated by reference herein in its entirety.

BACKGROUND

Technical Field

The present disclosure relates generally to communication systems, and more particularly, to wireless communication including beamforming.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. For example, there is a need to improve the beamforming process in millimeter wave systems. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In millimeter wave (mmW) systems, multiple antennas may be used at the base station and the user equipment (UE). The base station and the UE may perform a hierarchical beamforming process, for example, by using a beam refinement procedure, to find the finest and/or narrowest beam at the base station side and the UE side for beamformed communication. However, there may be situations in which a completion of such a beam refinement procedure might not be helpful in terms of additional accrued gains relative to the costs incurred, and may instead waste power and wireless resources. The present application provides a solution that enables efficient use of power and wireless resources by determining when it may be advantageous to perform an early stop to a beam refinement procedure. Aspects presented herein enable a base station to identify such situations when it may be advantageous to perform an early stop, such as when the base station side angular spread is small, when the Doppler related fading is large across paths, and/or when the beam switching rate at the UE side is slow. Aspects may include feedback techniques for the UE to indicate the UE capability information to the base station, and sounding methods for the base station to determine the angular spread. With such information, the base station may determine if and/or when to stop the beam refinement procedure.

In an aspect of the disclosure, a method, a computer-readable medium, and an apparatus are provided for wireless communication at a UE. The apparatus receives a signal over a plurality of beams from a base station in a beam refinement procedure during a hierarchical beamforming process. The apparatus transmits an indication to the base station, where the indication may be configured to assist the base station to determine whether to perform an early stop to the beam refinement procedure prior to a completion of the beam refinement procedure.

In another aspect of the disclosure, a method, a computer-readable medium, and an apparatus are provided for wireless communication at a base station. The apparatus receives from a UE a plurality of signals on a beam. The apparatus determines an angular spread at the base station based on the plurality of signals from the UE.

In yet another aspect of the disclosure, a method, a computer-readable medium, and an apparatus are provided for wireless communication at a base station. The apparatus transmits at least one signal over a plurality of beams in a beam refinement procedure with a UE. The apparatus further receives an indication from the UE. The apparatus determines whether to stop the beam refinement procedure prior to a completion of the beam refinement procedure based, at least in part, on the indication received from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 6 is a diagram illustrating an angular spread at the base station side.

DETAILED DESCRIPTION

Figure 1:
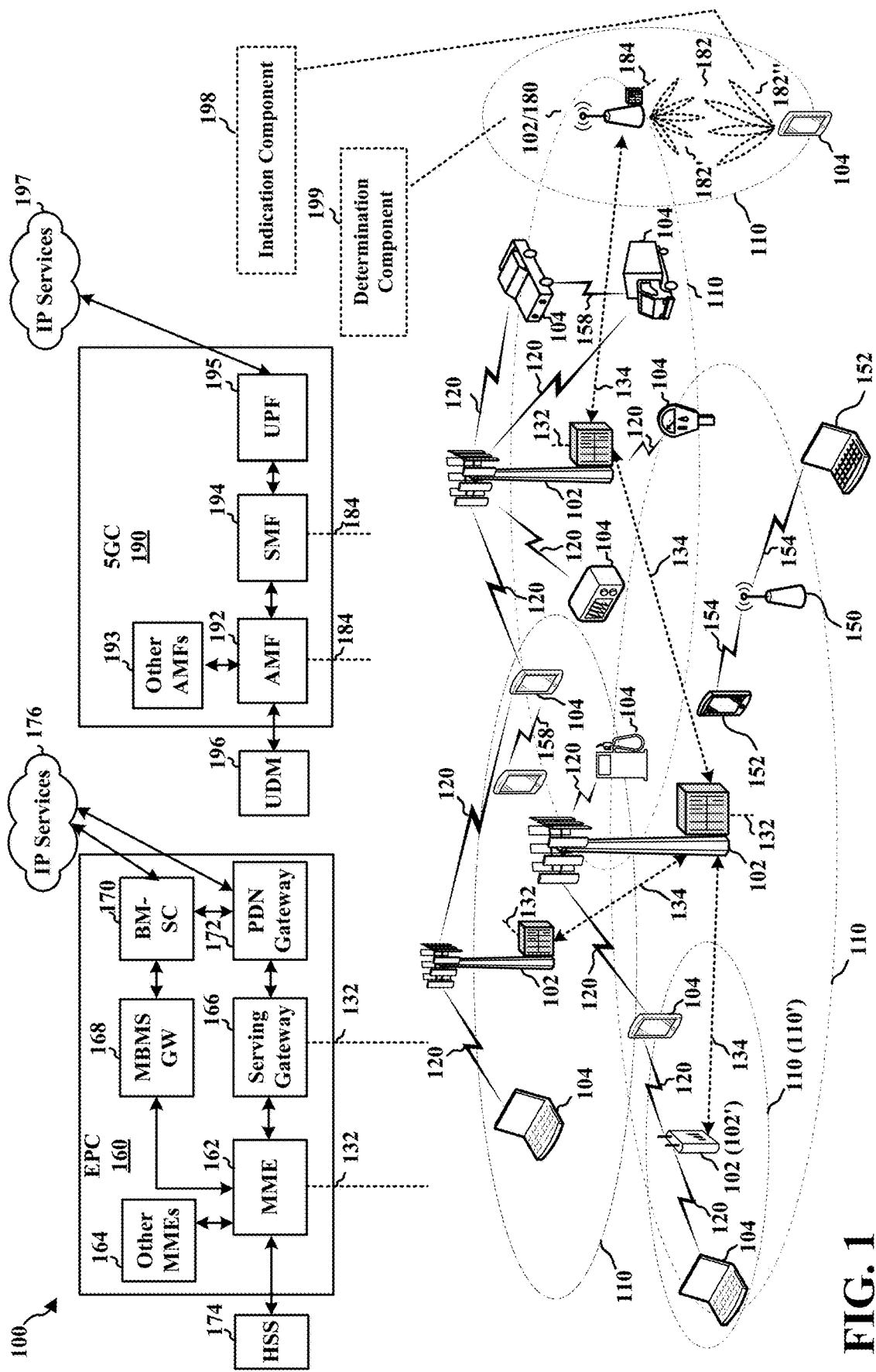
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, the base station 180 may transmit a signal over a plurality of beams in a beam refinement procedure with the UE 104 in a hierarchical beamforming process. In certain aspects, the UE 104 may receive the signal over the plurality of beams. The UE 104 may comprise an indication component 198 configured to transmit an indication to the base station 180. The indication may be configured to assist the base station to determine whether to perform an early stop to the beam refinement procedure prior to a completion of the beam refinement procedure. In some aspects, the base station 180 may receive the indication from the UE 104. The base station may comprise a determination component 199 configured to determine an angular spread and whether to stop a beam refinement procedure early, as illustrated. For example, the indication may include a plurality of training signals on a beam, and the base station 180 may determine an angular spread at the base station based on the plurality of training signals from the UE 104. For another example, the indication may indicate a beam switching capability of the UE 104, and the base station may determine whether to perform an early stop of the beam refinement procedure based on at least one of the beam switching capability of the UE 104, and the angular spread at the base station 180.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
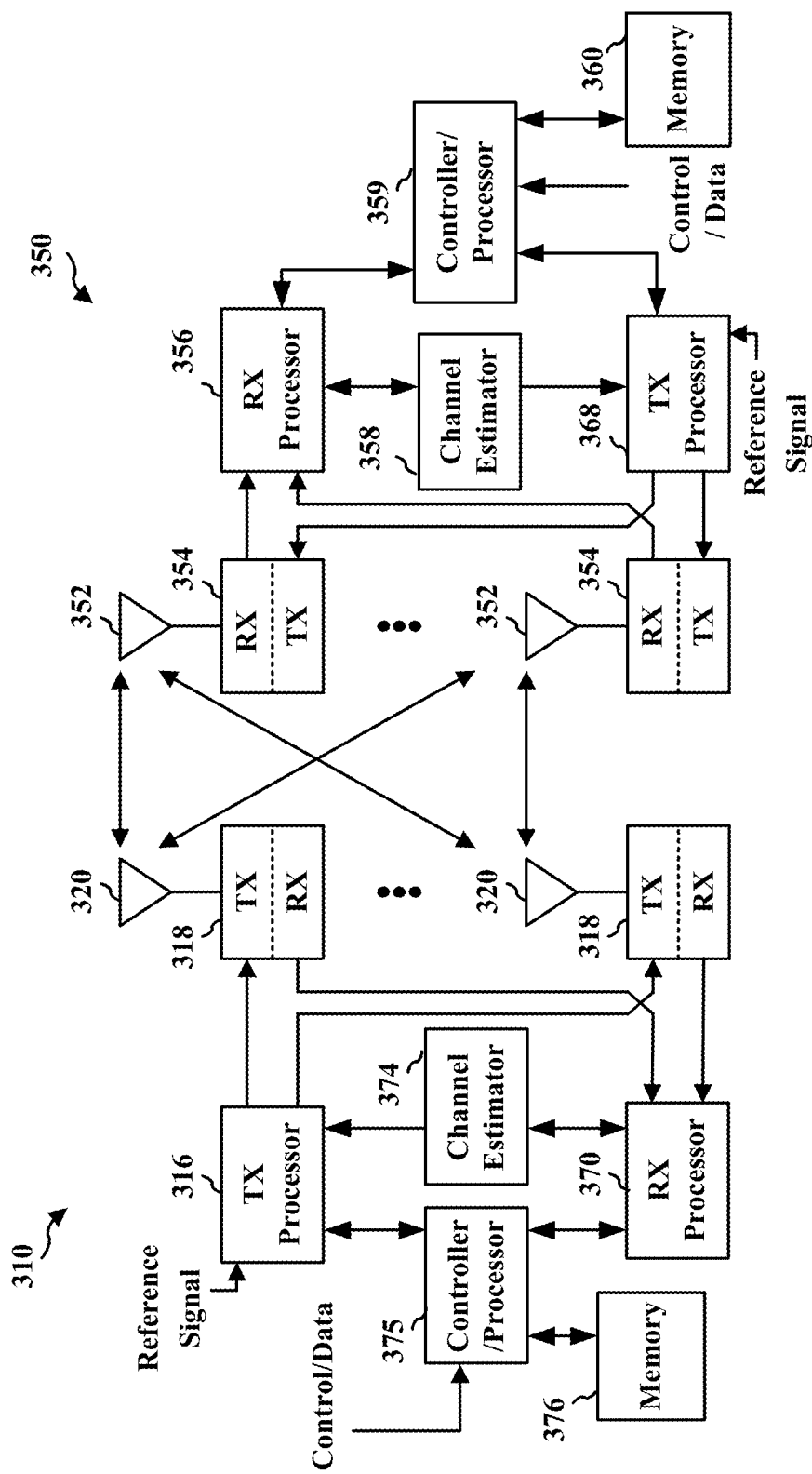
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
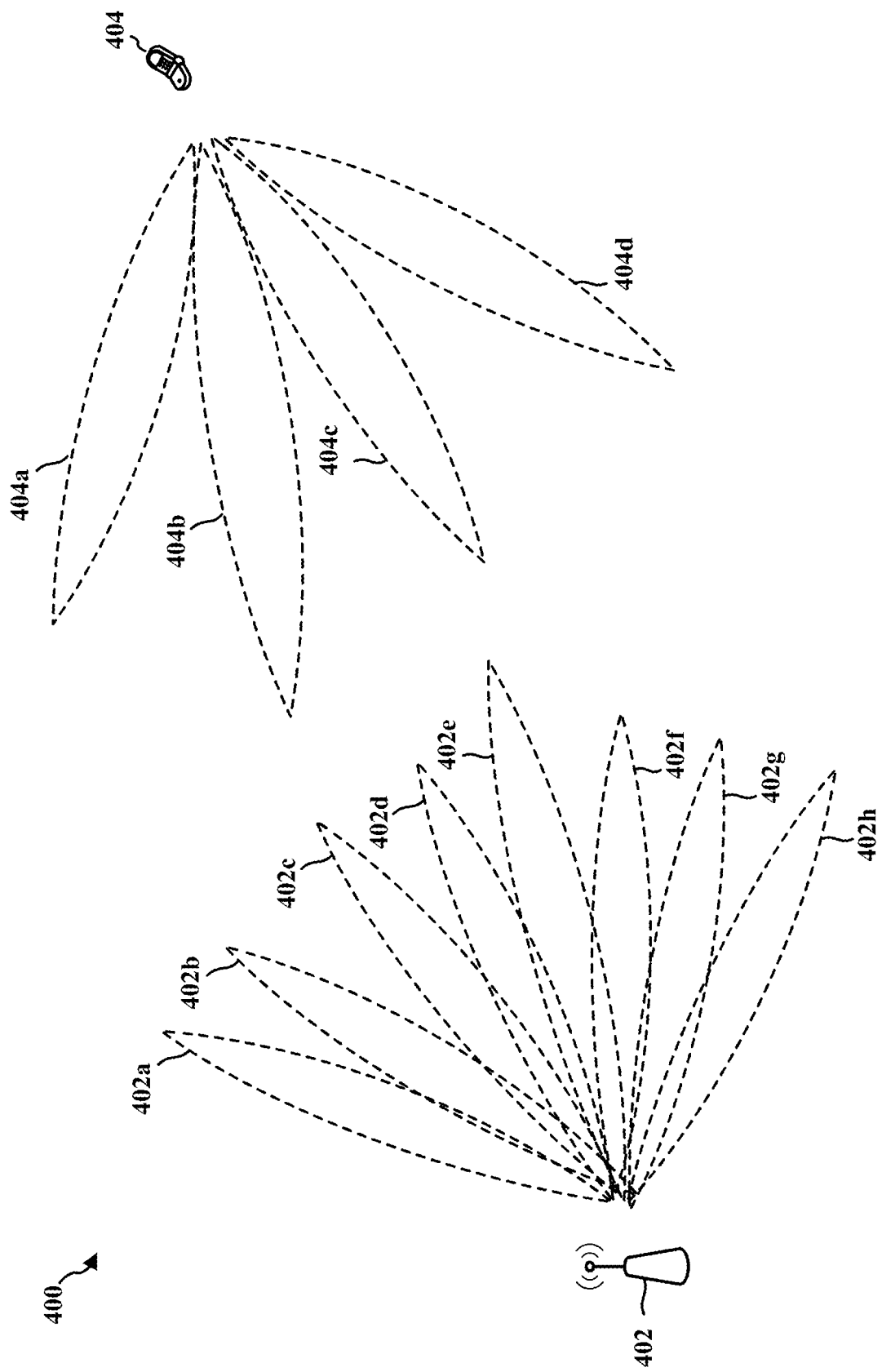
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5A:
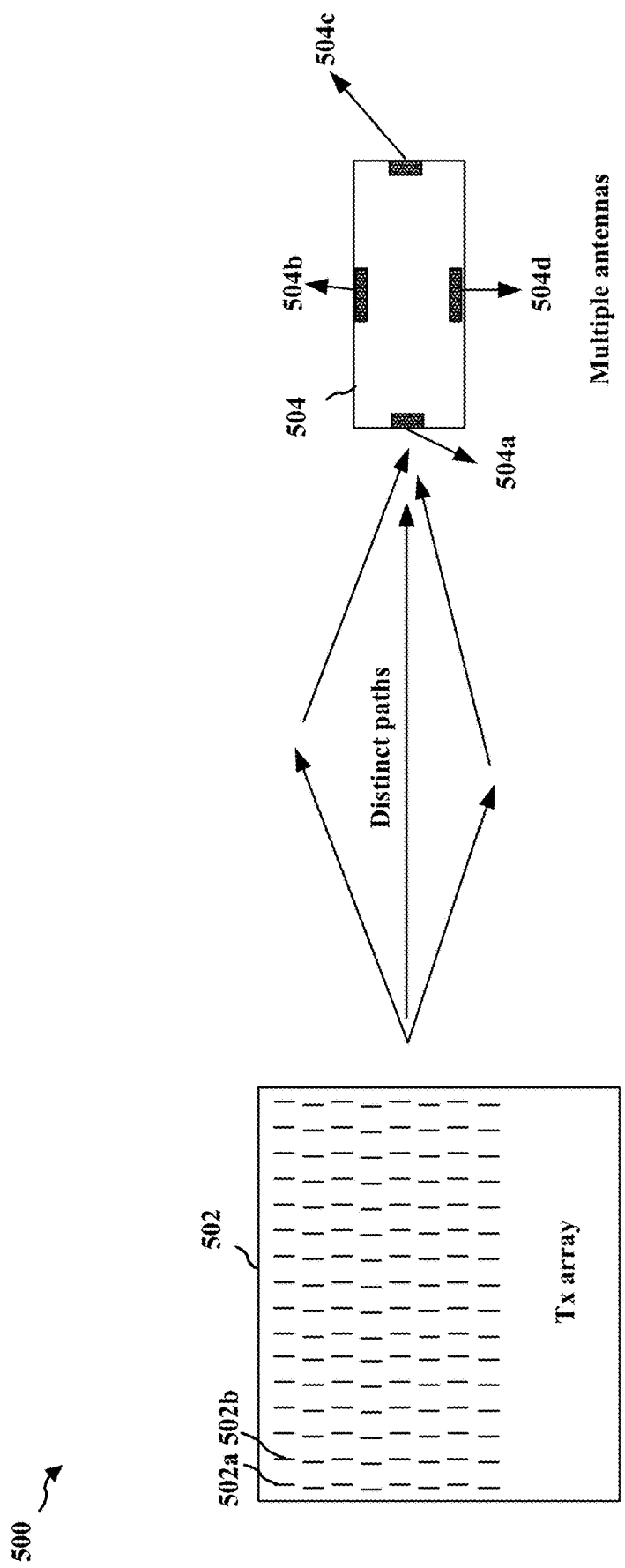
FIG. 5A is a diagram illustrating multiple antennas are used at the base station and the UE side in millimeter wave systems.

FIG. 5A is a diagram illustrating multiple antennas in an antenna array 502' used at a base station 502 to communication with a UE 504, in an mmW system. The communication between the base station and the UE 504 may be beamformed, as described in connection with FIG. 4. As shown in FIG. 5A, The base station may have an array 502' of antennas (e.g., 502a, 502b, . . . ) that enables the base station to transmit and receive using directional beams to the UE. The UE 504 may have multiple antenna subarray units 504a, 504b, 504c, and 504d that enables the UE to transmit and receive using directional beams. Beamforming is expected to be used to reduce a down link budget. In general, beamwidths at the base station are narrower than beamwidths at the UE 504 as more antennas are used at the base station antenna array 502 than in the subarrays at the UE. The base station 502 and the UE 504 may perform a hierarchical beamforming process. For example, the hierarchical beamforming process may include a beam refinement procedure to find the narrowest and finest beams at the base station 502 and the UE 504 to maximize array gain. The beam refinement procedure may include a multiple level refinement procedure, as described in connection with FIGS. 5B and 5C. However, there may be situations when a completion of such a beam refinement procedure is not helpful. For example, the beam refinement procedure may increase SNR, but negatively impact other factors. In these situations, it may be advantageous for the base station not to perform the beam refinement procedure, or stop the beam refinement procedure early. As presented herein, the base station may determine whether to continue to perform a beam refinement procedure or to stop the beam refinement procedure prior to completion. Additionally, the base station may be configured to receive an indication from a UE to assist the base station in making the determination to perform an early stop of the beam refinement procedure. The early stop/stoppage of the beam refinement procedure may be advantageous to lower latency and increase the reliability of the signals between the base station and UE.

Figure 5B:
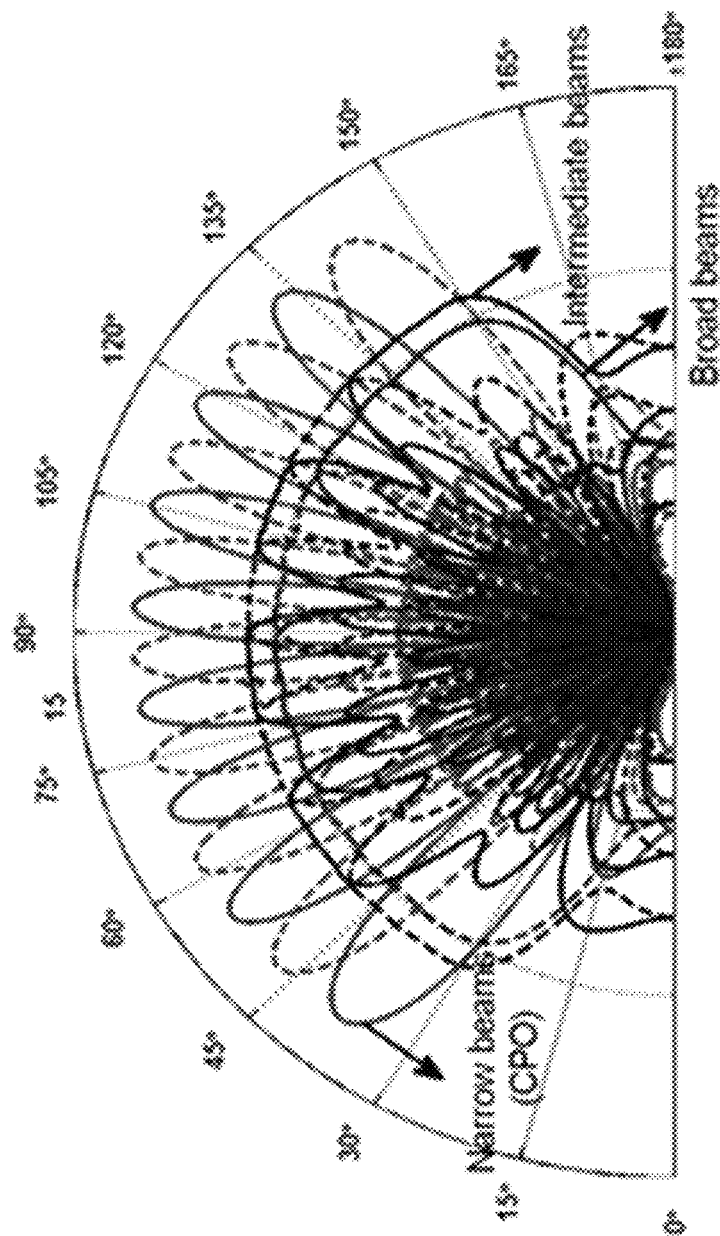
FIG. 5B is a diagram illustrating a plurality of beams at the base station side.
Figure 5C:
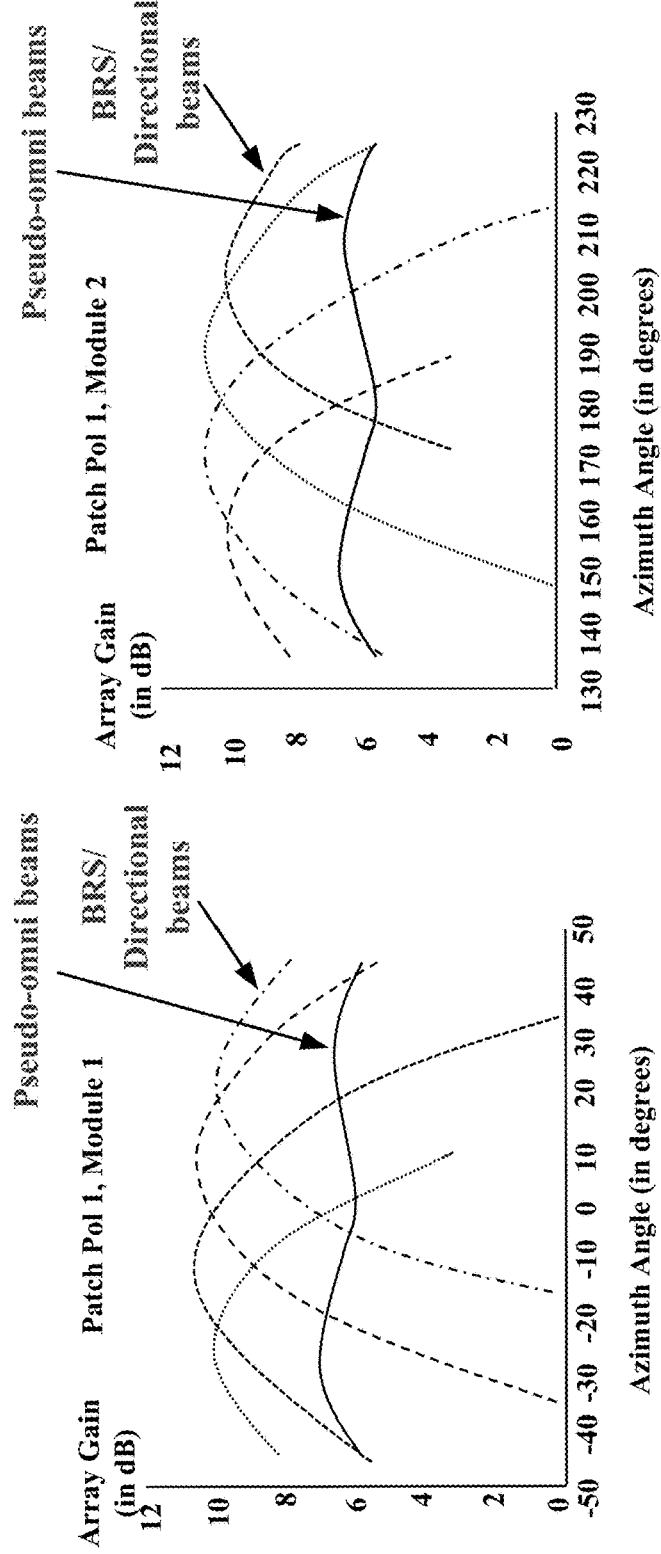
FIG. 5C is a diagram illustrating a plurality of beams at the UE side.

FIG. 5B is a diagram illustrating a plurality of beams at the base station 502. In a hierarchical beamforming process, the base station 502 may have multiple levels, e.g., three levels, of beam scanning. Level 1 may comprise a broad beam scanning, for example, the base station may have 4 beams to cover a coverage area, having an array gain of 5.5 dB with a 16×1 array (each beam may cover 30 degrees). Level 2 may comprise an intermediate beam scanning, for example, the base station 502 may have 8 beams to cover the coverage area, having an array gain of 8 dB with a 16×1 array (each beam may cover 15 degrees). Level 3 may comprise a narrow beam scanning, for example, the base station 502 may have 16 beams to cover the coverage area, having an array gain of 12 dB with a 16×1 array (each beam may cover about 7 degrees). Although only three levels of narrowing beamwidth are described, additional levels of increasingly narrow beamwidths may also be used for beam refinement by the base station. FIG. 5C is a diagram illustrating an example beam pattern of a plurality of beams at the UE 504. FIG. 5C illustrates pseudo-omni beams as well as directional beams.

There may be tradeoffs in the hierarchical beamforming process at the base station 502 and the UE 504. For example, there may be tradeoff between an initial link establishment time or beam acquisition latency and a peak SNR. The completion of the beam refinement procedure may find the finest and narrowest beams with the highest peak SNR at certain level in the hierarchy (e.g., Level 3), but at a cost of a higher initial link establishment time or a longer beam refinement latency than that of the beams at Level 2. As another example, there may also be tradeoff between robustness to blockage/Doppler with wider beams and a peak SNR. The finest and narrowest beams at Level 3 may have the highest peak SNR, but may have less robustness to blockage/Doppler than the wider beams at Level 2. In order to balance the need to reduce the beam refinement latency and the need for signal reliability, an early stop/stoppage of the beam refinement procedure may be performed, as presented herein.

FIG. 6 is a diagram 600 illustrating an angular spread 608 at a base station 602. There may be many scenarios where the angular spread 608 seen by the base station 602 is narrow, for example, within 15-30 degrees. For example, the base station 602 may be a Customer Premises Equipment (CPE) on a rooftop covering a UE 604 in an indoor setup (e.g., office, mall). As another example, the base station 602 may be on a lamp fixture covering the UE 604 in a busy downtown type setting or a narrow street. For yet another example, the base station 602 may cover the UE 604 (e.g., a car or a pedestrian) on a busy street.

Multiple paths/clusters within this angular spread 608 can undergo independent Doppler fading, especially if a bandwidth allocation is high (e.g., greater than 100 MHz). The base station 602 can switch from a best path/cluster to another best path/cluster using a Level 3 beam (e.g., due to such fading), only when the base station 602 is able to scan its Level 3 beams fast enough. Additionally, the UE 604 should be able to scan its best beams quickly enough for the base station 602 to perform the switch.

Fast beam switching capability at the base station 602 is typically possible, because the base station 602 is a network resource. However, fast beam switching capability at the UE 604 may require very complex hardware and may consume significant power. The beam switching capability of the UE 604 may be limited due to measurement and reporting signaling overhead or latency. For example, multiple measurement period configurations may be enabled, and a base station may select a preferred measurement period from among the configurations. As another example, if there is a UL/DL reciprocity mismatch (e.g., due to poor calibration, circuit mismatches, etc.), then the UE 604 may have to measure CSI-RS, and send a feedback signal instead of relying on secondary synchronization block signals (SSB). The CSI-RS measurements may limit the switching capability of the UE 604. A UE 604 may or may not have a fast switching capability. For example, a premium tier UE may have the fast switching capability, but a lower tier UE might not have the fast switching capability. When the UE has limitations on its beam switching capability, it may be better for the base station to stop a beam refinement procedure early, e.g. at a Level 2 stage.

For example, in the situations when the base station 602 has a narrow angular spread, and the UE 604 does not have the fast beam switching capability, it is advantageous to stop the beam refinement procedure early, for example, at Level 2. In order for the base station 602 to perform an early stop of the beam refinement procedure, the base station 602 may need to determine the angular spread at the base station 602, and the beam switching capability of the UE 604.

Figure 7:
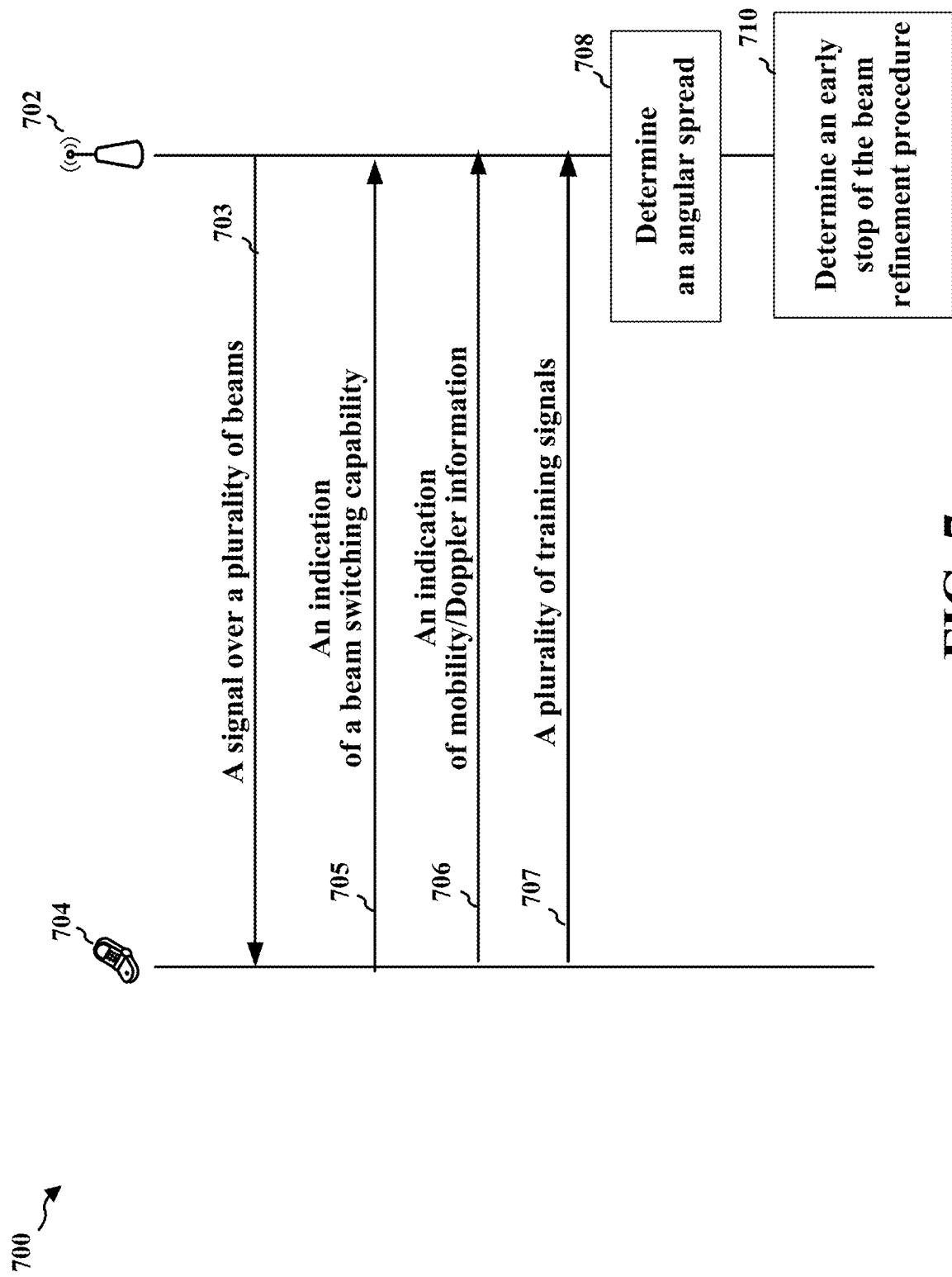
FIG. 7 is a flow diagram illustrating an example solution to determine whether to perform an early stop to a beam refinement procedure.

FIG. 7 is a flow diagram illustrating an example 700 of wireless communication involving an early stop/stoppage to a beam refinement procedure between a base station 702 (e.g., 102, 180, 310, 402, etc.) and a UE 704 (e.g., 104, 350, 404, etc.). The base station 702 may begin the beam refinement procedure in a hierarchical beamforming process, and transmit a signal over a plurality of beams 703 to a UE 704. The UE 704 may feed back various information to assist the base station 702 in making a determination to perform an early stop/stoppage of the beam refinement procedure, e.g., prior to a completion of the full beam refinement procedure.

The UE 704 may transmit an indication 705 of a beam switching capability or a hardware capability of the UE 704. In some aspects, the indication 705 may include information capturing a time that the UE 704 uses to scan through the plurality of beams from the base station 702. The plurality of beams may be scanned at a pseudo-omni level or a directional beam level at the UE 704 side, as the UE 704 determines. For example, the time may be based on a scan of the plurality of beams at the pseudo-omni beam level. For another example, the time may be based on a scan of the plurality of beams at the directional beam level. In some aspects, the indication 705 may include a number of beams on which the time is based. The number of beams scanned at the UE 704 may be UE-specific, and/or time-varying. For example, the number of beams the UE 704 considers in determining the beam switching rate may be time-varying.

In some aspects, the time in the indication 705 may be based on hardware related factors, including contributions from an antenna weight settling down latency, circuit related latencies, for example, a radio frequency circuit related latency, etc.

In some aspects, the UE 704 may scan through the plurality of beams slowly to save power. The UE may incorporate this power saving constraint in the feedback indication 705. For example, the time for the UE 704 to scan through the plurality of beams may be based on a power saving constraint at the UE 704, and the indication 705 may further indicate the power saving constraint. In some aspects, the indication 705 may further indicate a power consumption. For example, the UE 704 may feed back a rate of beam switching and the power consumption in the scanning process. In some aspects, an absence of a power consumption may indicate a nominal power consumption that is configured by the base station 702. If the UE 704 feeds back no power value, it may be taken by the base station 702 to indicate a nominal power consumption. In some aspects, the indication 705 may be associated with a quantized value. The set of quantized values may be configured by the base station 702. For example, the indication 705 may be quantized with quantization settings/meanings, which may be configured by the base station 702.

The UE 704 may transmit an indication 706 of mobility information for the UE 704 or Doppler estimate information for the UE 704. In some aspects, the mobility information or the Doppler estimate information for the UE 704 may be based on a plurality of measurements at a plurality of sensors at the UE 704. For example, the plurality of sensors may include one or more of an accelerometer, a gyroscope, and a tachometer.

The base station 702 may use the feedback 705, 706 from the UE in combination with other information to determine whether to continue or to stop the beam refinement procedure.

As a first example, the base station 702 may further base the determination on an amount of data, or a payload, to be conveyed from the base station 702 to the UE 704.

As a second example, the base station 702 may further base the determination on a number of Component Carriers (CCs) allocated to the UE 704. If the UE 704 requests a small number of CCs due to power consumption related issues, then the base station 702 may determine that a Level 3 beam may be better suited for communication with the UE, because the Level 3 beam may suffer less from Doppler fading. In contrast, when the UE 704 requests a large number or CCs, or when the base station 702 allocates a large number of CCs to the UE, the higher number of CCs indicates a higher payload. The base station 702 may determine that Level 2 beam may be a more robust choice from a Doppler perspective, which may guide the determination regarding whether to continue or stop the beam refinement procedure.

As a third example, the base station 702 may further base the determination on the angular spread seen at the base station. There may be several ways for the base station 702 to determine or estimate the angular spread. For example, the base station 702 may run through each of the Level 2 beams and the Level 3 beams in a beam refinement procedure and wait for the UE 704 to feed back a Reference Signal Received Power (RSRP) at every stage. With this information, the base station 702 may decide to go back to one of the Level 2 beams. However, this would require the base station to perform the Level 3 refinement procedure before determining to return to the Level 2 beam, wasting system resources, such as time, increasing power consumption at the UE 704, increasing the feedback overhead, etc.

The UE 704 may transmit a plurality of training signals 707 to the base station 702. The base station 702 may determine an angular spread at the base station 702 based on the plurality of training signals 707 from the UE 704, at 706. In some aspects, the base station 702 may estimate an RSRP based on the plurality of training signals 707. For example, the RSRP may be estimated for a set of beams having an adjacent or partially overlapping spatial or angular orientation. The angular spread may be determined based on a variation in the estimated RSRP for the set of beams. For example, the UE 704 may use a plurality of sounding reference signals (SRSs) as the plurality of training signals 707. The plurality of SRSs may be transmitted over multiple symbols or sub-symbols on a single best beam. The base station 702 may try out a set of beams, which are next to each other in terms of spatial/directional orientation, and estimate the RSRP. From the RSRP spread/variation, the angular spread at the base station 702 may be determined. There may be a cost in terms of system resources when using the SRSs. Thus, the UE 704 may limit use of the SRSs to once in a time period. The time period may be configured by the base station 702 to maintain system efficiency. The UE 704 may also use the SRSs in a semi-persistent manner. The angular spread at the base station 702 side might not be changed by an UL/DL reciprocity mismatch. In such a scenario of UL/DL reciprocity mismatches, the base station 702 may still use CSI-RS for beam training.

The base station 702 may determine whether to stop the beam refinement procedure prior to a completion of the beam refinement procedure based, at least in part, on the indication (e.g., 705, 706, 707) received from the UE 704, at 710. The base station 702 may determine the angular spread at its end by using the plurality of training signals 707 from the UE 704, as indicated at 708. The base station 702 may incorporate the feedback from the UE 704 with other information of the base station 702 and the angular spread at the base station 702, to make a determination to stop the beam refinement procedure prior to the completion of the beam refinement procedure. The feedback from the UE 704 may include any of the indication 705 of the beam switching capability, the indication 706 of the mobility or Doppler estimate information of the UE 704, and/or the training signals 707.

Figure 8:
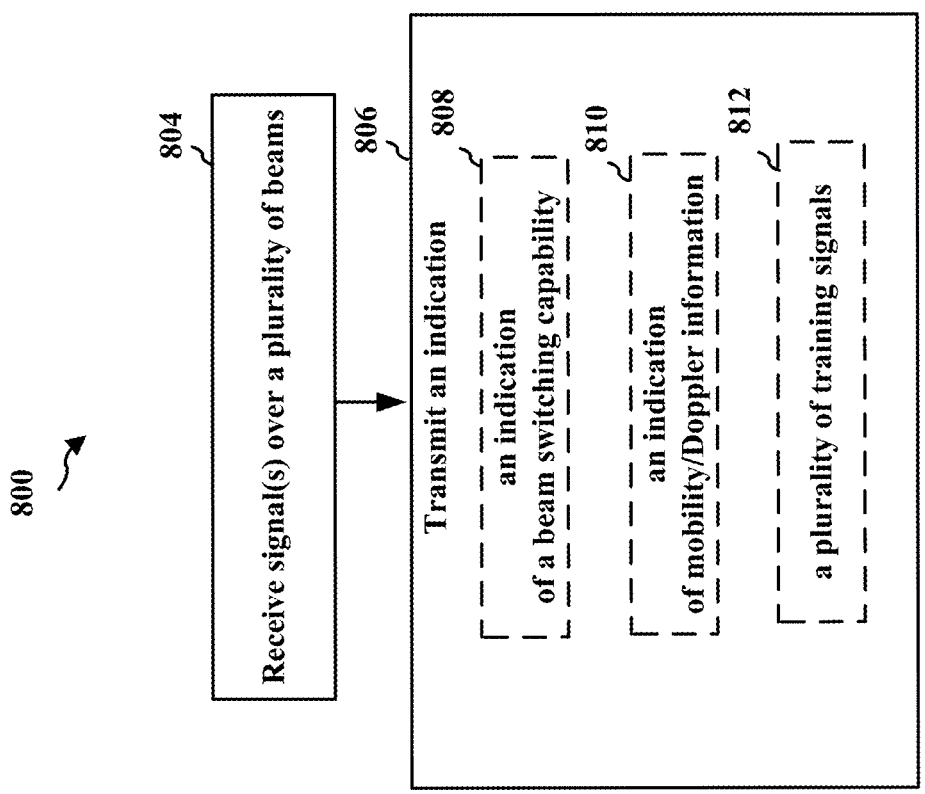
FIG. 8 is a flowchart of a method of wireless communication.

FIG. 8 is a flowchart 800 of a method of wireless communication. The method may be performed by a UE (e.g., UE 104, 350, 404, 704, 1204, the apparatus 902, 902') communicating with a base station (e.g., base station 102, 180, 402, 702, 950, the apparatus 1202, 1202'). The wireless communication may comprise 5G NR communication, e.g., mmW communication, as described herein. Optional aspects are illustrated with a dashed line. The method provides a solution to the problems that there may be situations when a completion of such a beam refinement procedure is not helpful. For example, the beam refinement procedure may increase SNR, but negatively impact other factors. As presented herein, the UE may transmit an indication to the base station. The indication may be configured to assist the base station to determine whether to perform the early stop to the beam refinement procedure, e.g., prior to a completion of the beam refinement procedure. In this way, the method may be advantageous to lower latency and increase the reliability of the signals between the base station and UE.

At 804, the UE receives at least one signal over a plurality of beams from a base station in a beam refinement procedure during a hierarchical beamforming process. There are situations where a completion of the beam refinement procedure may not be helpful. It may be advantageous to perform an early stop to the beam refinement procedure.

At 806, the UE transmits an indication to the base station. The indication may be configured to assist the base station to determine whether to perform the early stop to the beam refinement procedure, e.g., prior to a completion of the beam refinement procedure. For example, the information may assist the base station to determine to stop beam refinement at a Level 2 stage, e.g., an intermediate beam stage.

In some aspects, the indication may indicate the beam switching capability 808 of the UE, e.g., as described in connection with 705 in FIG. 7. The capability may indicate a hardware capability. The beam switching capability may comprise a beam switching rate for the UE. For example, the indication may indicate a time for the UE to scan through the plurality of beams received from the base station. The time indicated by the UE may be based on a scan of the plurality of beams at a pseudo-omni beam level. The time indicated by the UE may be based on a scan of the plurality of beams at a directional beam level. Thus, the number of beams to be scanned by the UE may be UE specific or time-varying. For example, the indication may indicate a number of beams on which the time is based. For example, the time requirement for beam scanning at the UE may be based, at least in part, on one or more of an antenna beam weight settling latency and a radio frequency circuit related latency.

For another example, the time may be based on a power saving constraint at the UE, and where the indication further indicates the power saving constraint. The UE may scan through the beams from the base station slowly in order to save power, and the UE may indicate information regarding this power saving constraint to the base station. For example, the indication may further indicate a power consumption, e.g., related to a beam scanning process. For example, an absence of a power consumption may indicate a nominal power consumption that is configured by the base station.

The indication transmitted by the UE may be associated with a quantized value. The quantized value, meaning, setting, etc. may be configured by the base station.

In some aspects, the indication may indicate mobility information 810 for the UE or Doppler estimate information for the UE, e.g., as described in connection with 706 in FIG. 7. For example, the mobility information or the Doppler estimate information may be based on a plurality of measurements at a plurality of sensors at the UE. The plurality of sensors may comprise one or more of an accelerometer, a gyroscope, a tachometer, etc.

In some aspects, the indication may comprise a plurality of training signals 812 on a selected beam, e.g., as described in connection with 707 in FIG. 7. For example, the plurality of training signals may comprise a plurality of sounding reference signals (SRSs). The plurality of training signals may be transmitted over a plurality of symbols or over a plurality of sub-symbols.

Figure 9:
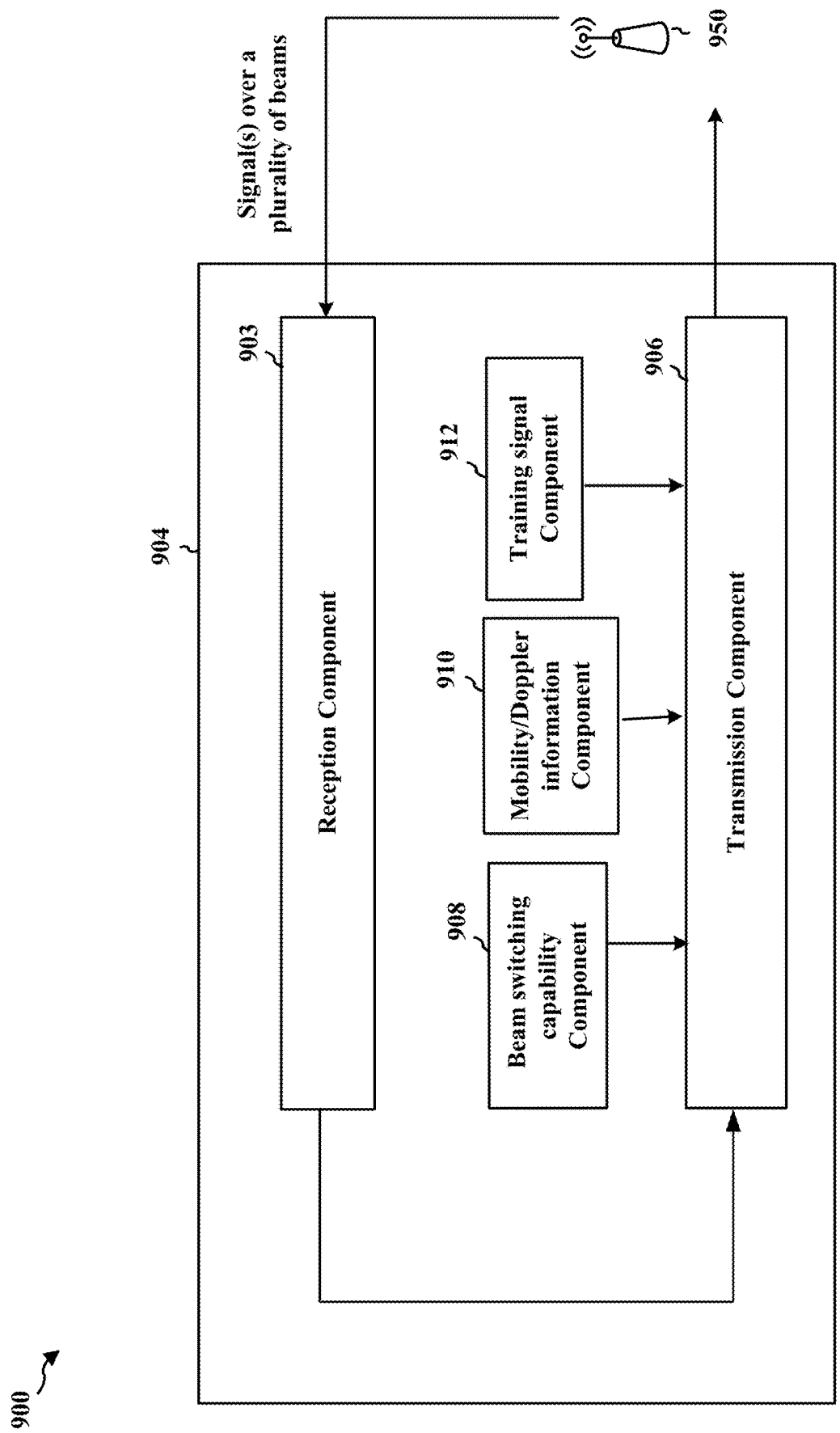
FIG. 9 is a conceptual data flow diagram illustrating the data flow between different means/components in an example apparatus.

FIG. 9 is a conceptual data flow diagram 900 illustrating the data flow between different means/components in an example apparatus 904. The apparatus may be a UE (e.g., UE 104, 350, 404, 704, 1204) communicating with a base station 950 (e.g., base station 102, 180, 402, 702, the apparatus 1202, 1202'). The wireless communication may comprise 5G NR communication, e.g., mmW communication, as described herein. The apparatus 904 includes a reception component 903 that receives a signal over a plurality of beams from a base station 950, e.g., in a beam refinement procedure during a hierarchical beamforming process. The apparatus 904 includes a transmission component 906 that transmits an indication to the base station 950. The indication transmitted to the base station 950 may be configured to assist the base station 950 to determine whether to perform an early stop to the beam refinement procedure prior to a completion of the beam refinement procedure In some aspects, the apparatus 904 may include a beam switching capability component 908. The beam switching capability component 908 may be configured to indicate a beam switching rate for the UE, as described in connection with 808 in FIG. 8. For example, the beam switching capability component 908 may indicate a time for the UE to scan the plurality of beams from the base station. In some aspects, the time may be based on a power saving constraint at the UE, and where the beam switching capability component 908 further indicates the power saving constraint. In some aspects, the apparatus 904 may include mobility information or Doppler estimate information component 910 configured to indicate mobility information for the UE or Doppler estimate information for the UE, as described in connection with 810 in FIG. 8. For example, the mobility information or the Doppler estimate information component 910 may be based on a plurality of measurements at a plurality of sensors at the UE. The plurality of sensors may comprise one or more of an accelerometer, a gyroscope, and a tachometer. In some aspects, the apparatus 904 may include a training signal component 912 configured to transmit a plurality of training signals to the base station, as described in connection with 812 in FIG. 8. The training signals may comprise a plurality of sounding reference signals (SRSs). The plurality of training signals component may be transmitted over a plurality of symbols or over a plurality of sub-symbols.

The apparatus may include additional components that perform each of the blocks of the algorithm in the aforementioned flowcharts of FIGS. 7 and 8 As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
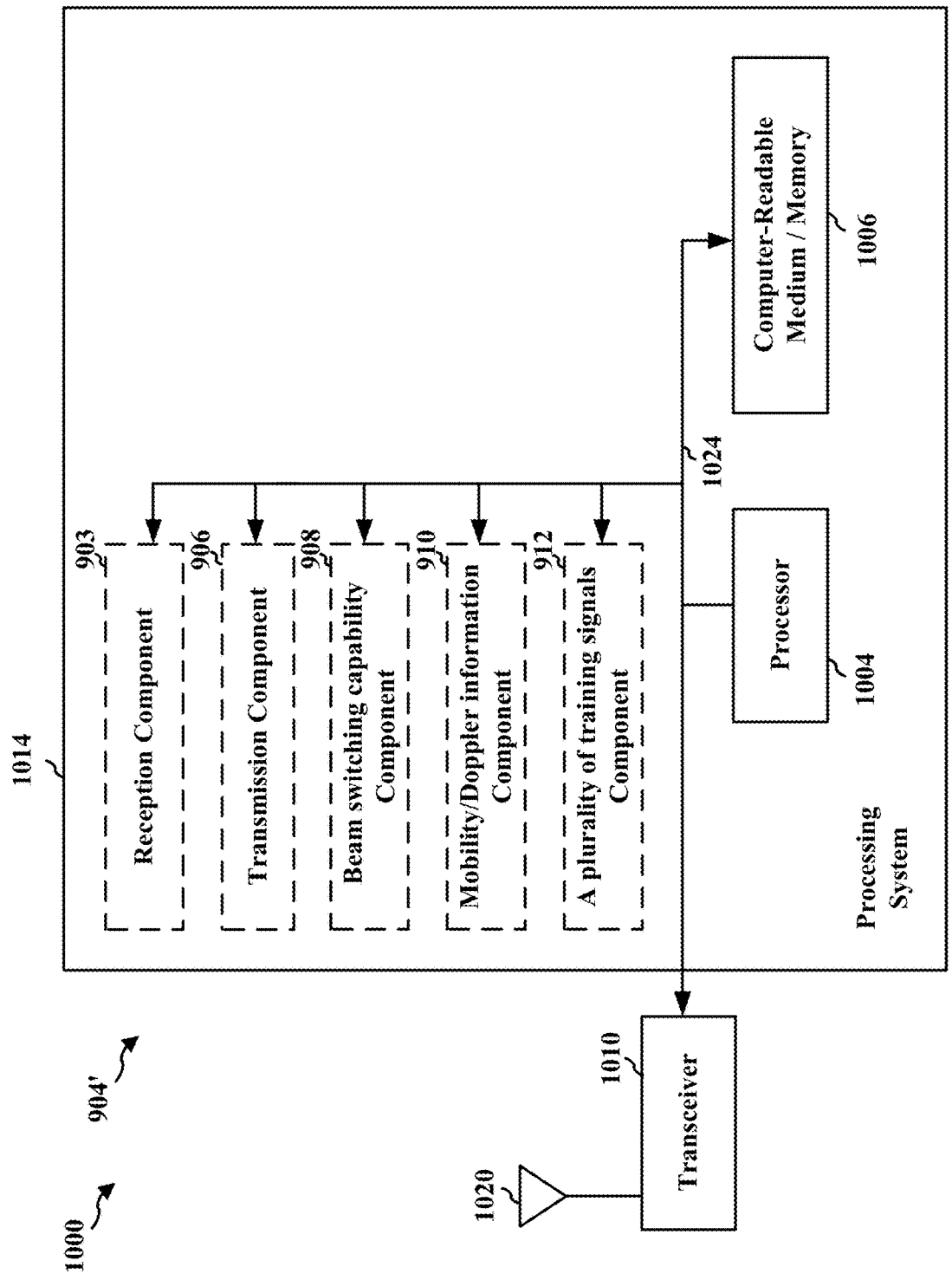
FIG. 10 is a diagram illustrating an example of a hardware implementation for an apparatus employing a processing system.

FIG. 10 is a diagram 1000 illustrating an example of a hardware implementation for an apparatus 904' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 903, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 903. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 904/904' for wireless communication includes means for receiving a signal over a plurality of beams from a base station in a beam refinement procedure during a hierarchical beamforming process, and means for transmitting an indication to the base station, where the indication may be configured to assist the base station to determine whether to perform an early stop to the beam refinement procedure prior to a completion of the beam refinement procedure. The aforementioned means may be one or more of the aforementioned components of the apparatus 904 and/or the processing system 1014 of the apparatus 904' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
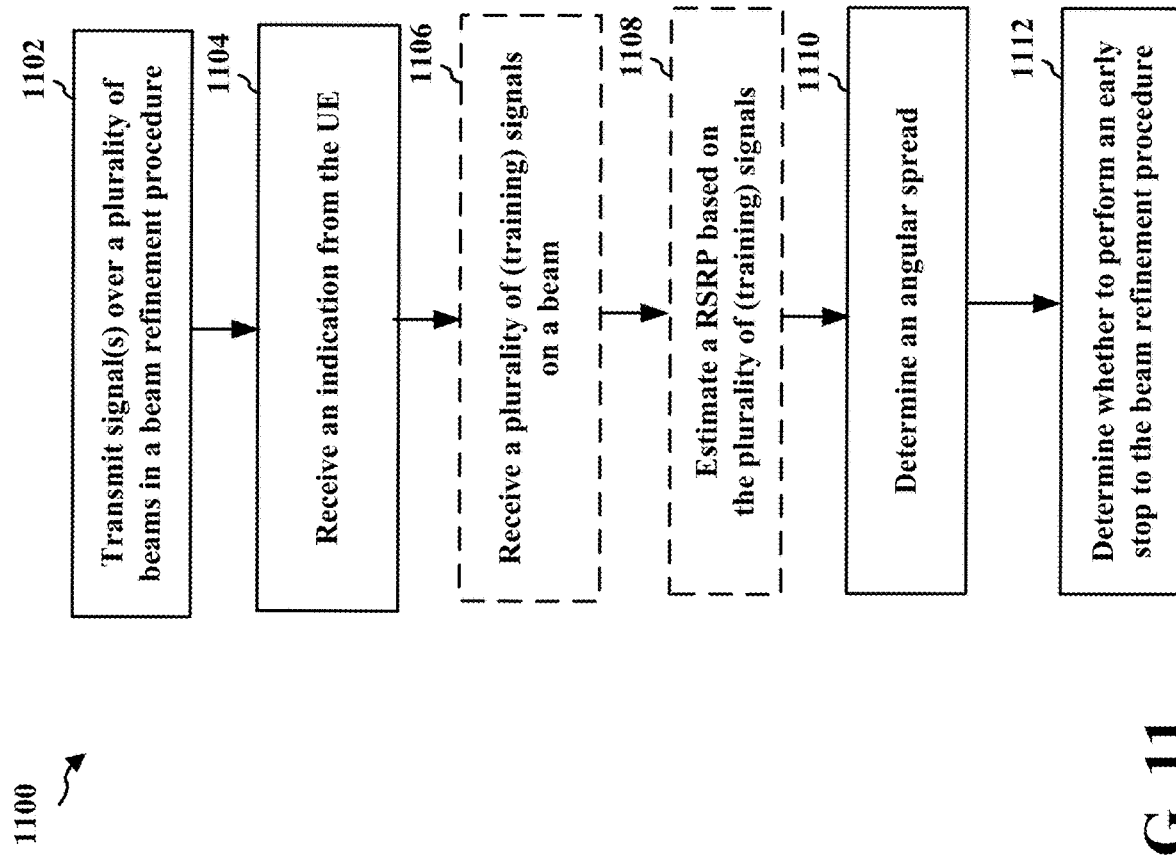
FIG. 11 is a flowchart of a method of wireless communication.

FIG. 11 is a flowchart 1100 of a method of wireless communication. The method may be performed by a base station (e.g., base station 102, 180, 402, 702, 950, the apparatus 1202, 1202') communicating with a UE (e.g., UE 104, 350, 404, 704, 1204, the apparatus 904, 904'). The wireless communication may comprise 5G NR communication, e.g., mmW communication, as described herein.

Optional aspects are illustrated with a dashed line. The method provides a solution to the problems that there may be situations when a completion of such a beam refinement procedure is not helpful. For example, the beam refinement procedure may increase SNR, but negatively impact other factors. As presented herein, the base station may be configured to receive an indication from a UE to assist the base station in making the determination to perform an early stop of the beam refinement procedure. In this way, the method may be advantageous to lower latency and increase the reliability of the signals between the base station and UE.

At 1102, the base station transmits at least one signal over a plurality of beams in a beam refinement procedure to the UE, for example, in a hierarchical beamforming process. The base station may be configured to perform an early stop/stoppage of the beam refinement procedure in situations where a completion of the beam refinement procedure may not be helpful.

At 1104, the base station receives an indication from the UE. In some aspects, the indication may indicate the beam switching capability of the UE, as described in connection with 705 in FIG. 7. The beam switching capability may comprise a beam switching rate for the UE. For example, the indication may indicate a time for the UE to complete a beam scan of the plurality of beams from the base station. For example, the indication may indicate a number of beams on which the time is based. For another example, the time may be based on a power saving constraint at the UE, and where the indication further indicates the power saving constraint. In some aspects, the indication may indicate mobility information or Doppler estimate information for the UE, as described in connection with 706 in FIG. 7. For example, the mobility information or the Doppler estimate information may be based on a plurality of measurements at a plurality of sensors at the UE. The plurality of sensors may comprise one or more of an accelerometer, a gyroscope, or a tachometer.

At 1106, the base station may receive a plurality of signals on a selected beam from the UE, as described in connection with 707 in FIG. 7. For example, the plurality of signals may comprise a plurality of training signals. The plurality of signals may comprise a plurality of sounding reference signals (SRSs). The plurality of signals may be transmitted over a plurality of symbols or over a plurality of sub-symbols.

At 1108, the base station may estimate a RSRP for a set of beams having an adjacent or partially overlapping spatial or angular orientation.

At 1110, the base stations determines the angular spread at the base station side, as described in connection with 708 in FIG. 7. For example, the base station may determine the angular spread based on a variation in the estimated RSRP for the set of beams.

At 1112, the base station determines whether to stop the beam refinement procedure prior to a completion of the beam refinement procedure based, at least in part, on the indication received from the UE, as described in connection with 710 in FIG. 7. For example, the base station may incorporate the indication received at 1104, the angular spread at the base station side determined at 1110, along with other information (e.g. an amount of data/payload to be conveyed to the UE, a number of CCs or bandwidth allocated to the UE), to determine whether to stop the beam refinement procedure prior to a completion of the beam refinement procedure based, at least in part, on the indication received from the UE.

Figure 14:
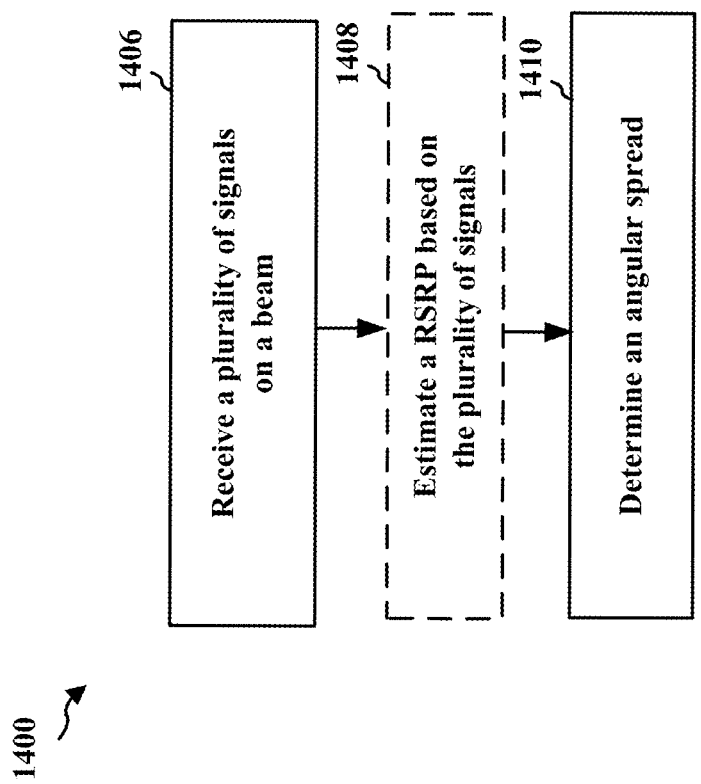
FIG. 14 is a flowchart of another method of wireless communication.

FIG. 14 is a flowchart 1400 of a method of wireless communication. The method may be performed by a base station (e.g., base station 102, 180, 402, 702, 950, the apparatus 1202, 1202') communicating with a UE (e.g., UE 104, 350, 404, 704, 1204, the apparatus 904, 904'). The wireless communication may comprise 5G NR communication, e.g., mmW communication, as described herein. Optional aspects are illustrated with a dashed line. The method provides a solution to the problems that there may be situations when a completion of such a beam refinement procedure is not helpful. For example, in the situations when the base station has a narrow angular spread, and the UE does not have the fast beam switching capability, it is advantageous to stop the beam refinement procedure early. In order for the base station to perform an early stop of the beam refinement procedure, the base station 602 may need to determine the angular spread at the base station and the beam switching capability of the UE. By determining the angular spread, the base station may determine an early stop of the beam refinement procedure, thereby lowering the latency and increasing the reliability of the signals between the base station and UE.

At 1406, the base station may receive a plurality of signals on a selected beam from the UE. For example, the plurality of training signals may comprise a plurality of training signals. In one example, the plurality of signals may comprise a plurality of sounding reference signals (SRSs). The plurality of signals may be transmitted over a plurality of symbols or over a plurality of sub-symbols.

At 1410, the base stations determines the angular spread at the base station side, as described in connection with 708 in FIG. 7. For example, the base station may determine the angular spread based on a variation in the estimated RSRP for the set of beams.

Thus, at 1408, the base station may also estimate an RSRP based on the plurality of signals received at 1406. The RSRP may be estimated for a set of beams having an adjacent or partially overlapping spatial or angular orientation.

Figure 12:
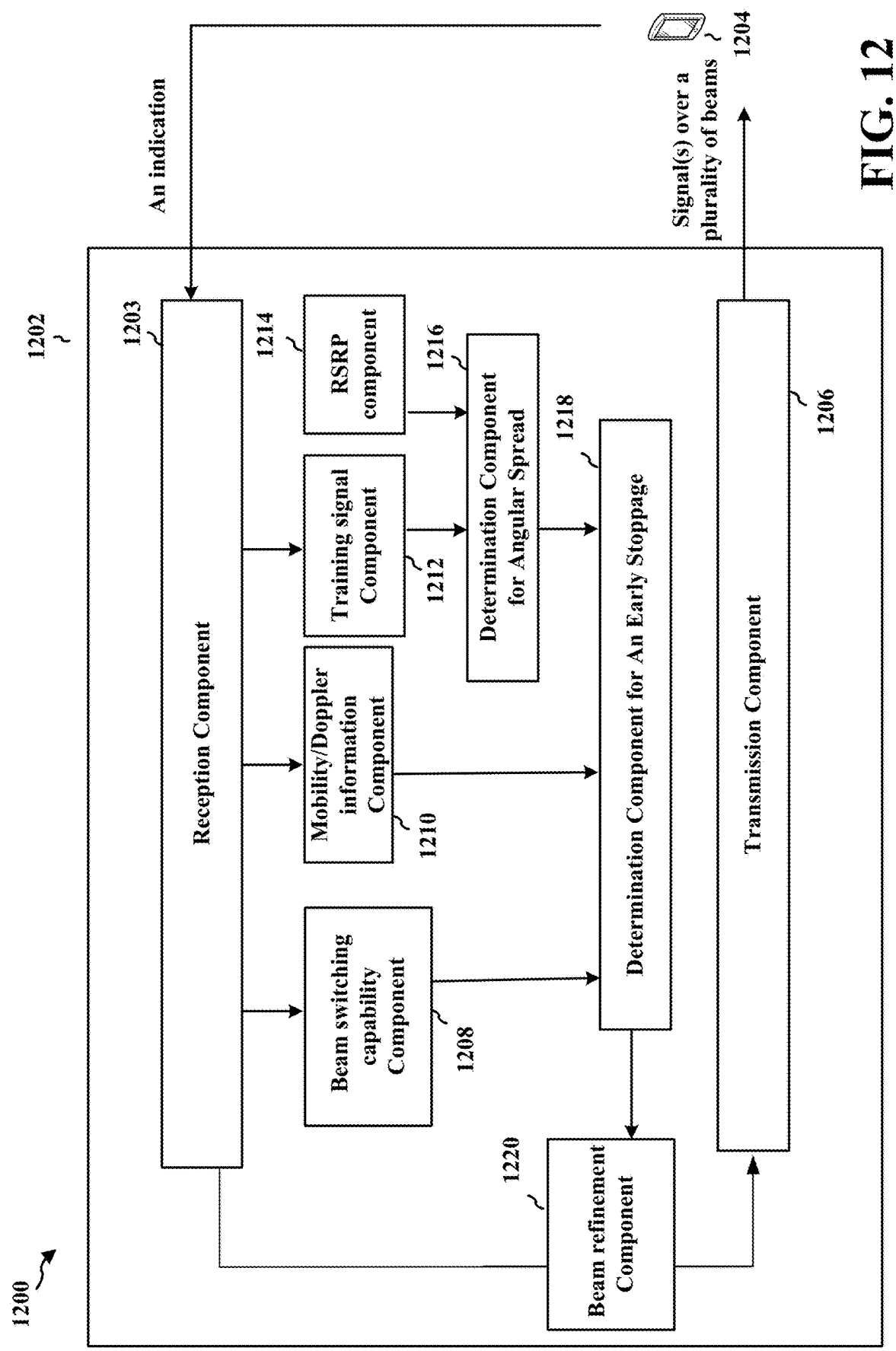
FIG. 12 is a conceptual data flow diagram illustrating the data flow between different means/components in an example apparatus.

FIG. 12 is a conceptual data flow diagram 1200 illustrating the data flow between different means/components in an exemplary apparatus 1202. The apparatus may be a base station (e.g., base station 102, 180, 402, 702, 950 communicating with a UE (e.g., UE 104, 350, 404, 704, 1204, the apparatus 904, 904'). The wireless communication may comprise 5G NR communication, e.g., mmW communication, as described herein. The apparatus includes a beam refinement component 1220 configured to begin a beam refinement procedure with a UE. The apparatus 1202 includes a transmission component 1206 configured to transmit a signal over a plurality of beams in a beam refinement procedure with a User Equipment (UE) 1204. The apparatus 1202 includes a reception component 1203, which is configured to receive an indication from the UE 1204. The apparatus 1202 includes a determination component 1218, which is configured to determine whether to stop the beam refinement procedure prior to a completion of the beam refinement procedure based, at least in part, on the indication received from the UE 1204. When it is determined to perform an early stop, the determination may be indicated to the beam refinement component 1220.

In some aspects, the apparatus 1202 may include a beam switching capability component 1208. The beam switching capability component 1208 may be configured to receive an indication of a beam switching rate of the UE 1204, as described in connection with 1104. In some aspects, the apparatus 1202 may include a mobility information or Doppler estimate information component 1210, configured to receive an indication of the mobility information or the Doppler estimate information of the UE 1204, as described in connection with 1104. In some aspects, the apparatus 1202 may include a training signal component 1212. The plurality of training signals component 1212 may be configured to receive a plurality of training signals, for example, a plurality of sounding reference signals (SRSs) from the UE 1204, as described in connection with 1108, 1408.

In some aspects, the apparatus 1202 may include a determination component for an angular spread 1216 at the base station side. For example, the plurality of training signals component 1212 may be configured to receive the plurality of training signals on the selected beam from the UE 1204. For example, the plurality of training signals may comprise the plurality of sounding reference signals (SRSs). The plurality of training signals may be transmitted over a plurality of symbols or over a plurality of sub-symbols. The apparatus 1202 may further include a RSRP component configured to estimate a RSRP for a set of beams having an adjacent or partially overlapping spatial or angular orientation.

The determination component 1218 is configured to make a determination of whether to perform an early stop/stoppage based on, at least in part, the information from the beam switching component 1208, and/or the information from the mobility/Doppler information component 1210, and/or the information from the angular spread determination component 1216.

The apparatus may include additional components that perform each of the blocks of the algorithm in the aforementioned flowcharts of FIGS. 7, 11, and 14. As such, each block in the aforementioned flowcharts of FIGS. 7, 11, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
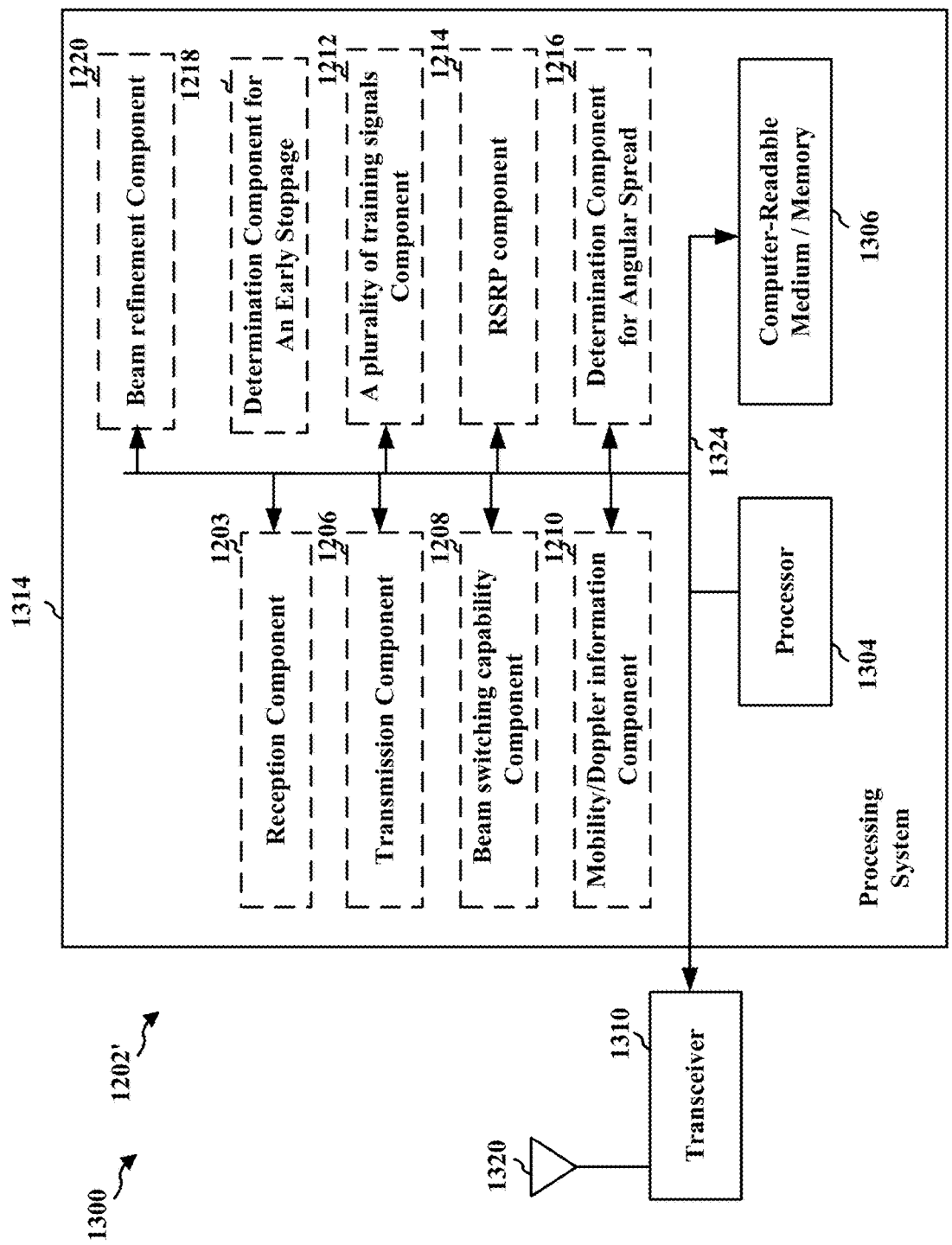
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1203, 1206, 1208, 1210, 1212, 1214, 1216, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1203. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a signal over a plurality of beams in a beam refinement procedure with a UE; means for determining an angular spread at the base station based on the plurality of training signals from the UE; means for estimating an RSRP; means for beginning a beam refinement procedure with a UE; means for receiving an indication from the UE; and means for determining whether to stop the beam refinement procedure prior to a completion of the beam refinement procedure based, at least in part, on the indication received from the UE. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving at least one signal over a plurality of beams from a base station in a beam refinement procedure during a hierarchical beamforming process; and
   transmitting an indication to the base station, the indication comprising at least one of a beam switching capability of the UE, mobility information for the UE, Doppler estimate information for the UE, or a plurality of training signals on a selected beam, wherein the indication causes the beam refinement procedure at the base station to stop prior to completion of the beam refinement procedure.

2. The method of claim 1, wherein the indication indicates a beam switching capability of the UE.

3. The method of claim 2, wherein the beam switching capability comprises a beam switching rate for the UE.

4. The method of claim 3, wherein the indication is associated with a quantized value that is configured by the base station.

5. The method of claim 1, wherein the indication indicates mobility information for the UE or Doppler estimate information for the UE.

6. The method of claim 5, wherein the mobility information or the Doppler estimate information is based on a plurality of measurements from at least one sensor at the UE, wherein the at least one sensor comprises one or more of an accelerometer, a gyroscope, or a tachometer.

7. The method of claim 1, wherein the indication comprises a plurality of training signals on a selected beam.

8. The method of claim 7, wherein the plurality of training signals comprises a plurality of sounding reference signals (SRSs).

9. The method of claim 7, further comprising
   transmitting the plurality of training signals over a plurality of symbols or over a plurality of sub-symbols.

10. A method of wireless communication at a user equipment (UE), comprising:
    receiving at least one signal over a plurality of beams from a base station in a beam refinement procedure during a hierarchical beamforming process; and
    transmitting an indication to the base station, the indication comprising at least one of a beam switching capability of the UE, mobility information for the UE, Doppler estimate information for the UE, or a plurality of training signals on a selected beam, wherein the indication indicates a beam switching capability of the UE and a time for the UE to complete a beam scan of the plurality of beams from the base station.

11. The method of claim 10, wherein the time is based on a scan of the plurality of beams at a pseudo-omni beam level or at a directional beam level.

12. The method of claim 10, wherein the indication indicates a number of beams on which the time is based.

13. The method of claim 10, wherein the time is based at least in part on one or more of an antenna beam weight settling latency and a radio frequency circuit related latency or the time is based on a power saving constraint at the UE, and wherein the indication further indicates the power saving constraint.

14. A method of wireless communication at a user equipment (UE), comprising:
    receiving at least one signal over a plurality of beams from a base station in a beam refinement procedure during a hierarchical beamforming process; and
    transmitting an indication to the base station, the indication comprising at least one of a beam switching capability of the UE, mobility information for the UE, Doppler estimate information for the UE, or a plurality of training signals on a selected beam, wherein the indication indicates a beam switching rate of a beam switching capability of the UE, wherein the indication further indicates a power consumption, and wherein an absence of a power consumption indicates a nominal power consumption that is configured by the base station.

15. An apparatus for wireless communication at a user equipment (UE), comprising:
    a memory; and
    at least one processor coupled to the memory and configured to:
       receive at least one signal over a plurality of beams from a base station in a beam refinement procedure during a hierarchical beamforming process; and
       transmit an indication to the base station, the indication comprising at least one of a beam switching capability of the UE, mobility information for the UE, Doppler estimate information for the UE, or a plurality of training signals on a selected beam, wherein the indication causes the beam refinement procedure at the base station to stop prior to completion of the beam refinement procedure.

16. A method of wireless communication at a base station, comprising:
    transmitting at least one signal over a plurality of beams in a beam refinement procedure with a User Equipment (UE);
    receiving an indication from the UE indicative of an effect upon the UE if the base station stops the beam refinement procedure prior to a completion of the beam refinement procedure; and
    determining whether to stop the beam refinement procedure prior to the completion of the beam refinement procedure based, at least in part, on the indication received from the UE.

17. The method of claim 16, wherein the base station determines whether to stop the beam refinement procedure further based on an angular spread for the base station.

18. The method of claim 17, further comprising:
receiving, from the UE, a plurality of signals on a beam over a plurality of symbols or a plurality of sub-symbols; and
determining the angular spread for the base station based on the plurality of signals.

19. The method of claim 18, wherein the plurality of signals comprises a plurality of sounding reference signals (SRSs), the method, further comprising
estimating a Reference Signal Received Power (RSRP) for a set of beams having an adjacent or partially overlapping orientation, the estimating based on the plurality of signals.

20. The method of claim 19, wherein the angular spread is determined based on the RSRP for each of the set of beams.

21. The method of claim 16, wherein the indication indicates a beam switching capability of the UE.

22. The method of claim 16, wherein the indication indicates mobility information for the UE.

23. The method of claim 22, wherein the indication comprises Doppler estimate information for the UE.

24. A method of wireless communication at a base station, comprising:
transmitting at least one signal over a plurality of beams in a beam refinement procedure with a User Equipment (UE);
receiving an indication from the UE, wherein the indication indicates a beam switching capability of the UE and a time for the UE to complete a beam scan of a plurality of beams from the base station; and
determining whether to stop the beam refinement procedure prior to a completion of the beam refinement procedure based, at least in part, on the indication received from the UE.

25. A method of wireless communication at a base station, comprising:
transmitting at least one signal over a plurality of beams in a beam refinement procedure with a User Equipment (UE);
receiving an indication from the UE, wherein the indication indicates a beam switching capability of the UE and power consumption at the UE related to the beam refinement procedure; and
determining whether to stop the beam refinement procedure prior to a completion of the beam refinement procedure based, at least in part, on the indication received from the UE.

26. A method of wireless communication at a base station, comprising:
transmitting at least one signal over a plurality of beams in a beam refinement procedure with a User Equipment (UE);
receiving an indication from the UE; and
determining whether to stop the beam refinement procedure prior to a completion of the beam refinement procedure based, at least in part, on the indication received from the UE, and further based on an amount of data to be conveyed from the base station to the UE.

27. A method of wireless communication at a base station, comprising:
transmitting at least one signal over a plurality of beams in a beam refinement procedure with a User Equipment (UE);
receiving an indication from the UE; and
determining whether to stop the beam refinement procedure prior to a completion of the beam refinement procedure based, at least in part, on the indication received from the UE, and further based on a number of Component Carriers (CCs) or bandwidth allocated to the UE.

28. An apparatus for wireless communication at a base station, comprising:
a memory; and
at least one processor coupled to the memory and configured to:
transmit at least one signal over a plurality of beams in a beam refinement procedure with a User Equipment (UE);
receive an indication from the UE indicative of an effect upon the UE if the base station stops the beam refinement procedure prior to a completion of the beam refinement procedure; and
determine whether to stop the beam refinement procedure prior to the completion of the beam refinement procedure based, at least in part, on the indication received from the UE.

29. The apparatus of claim 28, wherein the at least one processor is further configured to determine whether to stop the beam refinement procedure further based on an angular spread for the base station.

30. The apparatus of claim 29, wherein the at least one processor is further configured to:
receive, from the UE, a plurality of signals on a beam over a plurality of symbols or a plurality of sub-symbols; and
determine the angular spread for the base station based on the plurality of signals.

* * * * *